United States Patent [19]

Baghdachi et al.

[11] Patent Number: 5,368,943
[45] Date of Patent: Nov. 29, 1994

[54] POLYURETHANE BLOCK COPOLYMER

[75] Inventors: Jamil Baghdachi, Northville; Cheryl Van Valkenburg, Westland, both of Mich.

[73] Assignee: Adco Products, Inc., Michigan Center, Mich.

[21] Appl. No.: 811,389

[22] Filed: Dec. 20, 1991

[51] Int. Cl.$^5$ .................. B32B 17/10; B32B 27/40
[52] U.S. Cl. .................. 428/423.1; 428/428; 525/102; 525/131; 525/440; 525/446
[58] Field of Search ............ 525/102, 101, 131, 440, 525/446; 428/423.1, 428

[56] References Cited

U.S. PATENT DOCUMENTS

| | | | |
|---|---|---|---|
| 3,632,557 | 1/1972 | Brode | 528/38 |
| 3,678,010 | 7/1972 | Brode | 525/446 |
| 3,919,351 | 11/1975 | Chang et al. | 525/131 |
| 3,935,367 | 1/1976 | Merrill et al. | 525/454 |
| 3,975,457 | 8/1976 | Chang et al. | 525/131 |
| 4,146,585 | 3/1979 | Ward et al. | 525/102 |
| 4,408,021 | 10/1983 | Penn | 525/440 |
| 4,491,650 | 1/1985 | Rizk et al. | 525/102 |
| 4,567,107 | 1/1986 | Rizk et al. | 428/425.5 |

FOREIGN PATENT DOCUMENTS 182924  11/1984  European Pat. Off. ....... C08F 8/42

*Primary Examiner*—Ralph H. Bean
*Attorney, Agent, or Firm*—Killworth, Gottman, Hagan & Schaeff

[57] ABSTRACT

A silane-capped polyurethane block copolymer comprising at least one polyester block and at least one polyacrylate block is disclosed. The copolymer can be used in coatings, and is particularly useful as a primer coating, especially as a primer for non-porous surfaces to which adhesives will be applied.

23 Claims, No Drawings

POLYURETHANE BLOCK COPOLYMER

FIELD OF THE INVENTION

This invention relates to polymer chemistry, and in particular to polyurethane block copolymers that can be used in primer coating compositions, especially on glass surfaces.

BACKGROUND OF THE INVENTION

Polymer coatings are often used to improve the effectiveness of adhesives. Such coatings can be referred to as primer coatings, and can be particularly effective at improving the effectiveness of adhesives on non-porous surfaces, such as glass, steel, aluminum, and ceramic materials.

U.S. Pat. No. 4,408,012 describes moisture-activated adhesives useful for adhering a solar film to glass. These adhesives comprise the reaction product of a gamma-isocyanatopropyltriethoxy silane containing a free isocyanate group and a thermoplastic polyester.

U.S. Pat. No. 4,146,585 discloses moisture-curable compositions described as polymeric adhesion promoters. These compositions comprise a silane-grafted binary copolymer or terpolymer that is prepared by reacting an isocyanato-functional organosilane containing from 1 to 3 silicon-bonded hydrolyzable groups with a hydroxy-functional copolymer or terpolymer.

Primer coatings are often used in the automotive industry on glass windshields to improve the effectiveness of the adhesive sealants used to adhere the windshield to the automotive body. In modern automotive design construction, the windshield is an integral part of the structural integrity of the vehicle. Thus, it is critical that the windshield sealant securely bond the windshield to the vehicle body panels. Accordingly, the adhesive bond between the windshield and the automotive body must meet highly rigorous performance standards with regard to weathering, and resistance to heat, ultraviolet radiation, and moisture. With regard to heat, it is desirable that the adhesive bond resist temperatures of up to 88°C.

One glass primer that has been so utilized in the automotive industry is a silane-terminated polyester polyurethane consisting of polyester blocks linked together through urethane linkages. However, neither this primer nor the above-described prior art compositions provide as high a degree of resistance to weathering, heat, UV radiation, and moisture as is often desired. It is therefore an object of the invention to provide a polymer that can be effectively used in a primer coating composition, and that has a high degree of resistance to weathering, heat, UV radiation, and moisture.

SUMMARY OF THE INVENTION

According to the invention, there is provided a silane-capped polyurethane block copolymer comprising at least one polyester block and at least one polyacrylate block. This polymer can be prepared by reacting a polyester containing groups reactive with isocyanate, a polyacrylate containing groups reactive with isocyanate, and a polyisocyanate to form an isocyanate-terminated polyurethane block copolymer. This copolymer can be reacted with a silane-containing compound, such as an aminoalkoxysilane or mercaptoalkoxysilane, to produce the silane-capped polyurethane block copolymer.

The polyurethane block copolymer of the invention can be used as a primer on either porous or non-porous surfaces to improve the adhesion of a variety of sealant adhesives, such as polyurethane sealant adhesives. The copolymer is particularly effective on non-porous surfaces, such as glass, and is highly resistant to the effects of weathering, heat, UV radiation, and moisture.

DESCRIPTION OF THE PREFERRED EMBODIMENTS

The polyacrylate block used in the practice of the invention can be of any type that can be incorporated in a polyurethane block copolymer. Accordingly, the polyacrylate block should be derived from a polyacrylate having functional groups that are reactive with an isocyanate functionality. Such polyacrylates include, for example, the preferred hydroxyl-functional polyacrylates, and also amine-functional acrylates, and amide-functional acrylates, which are well-known in the art. In a preferred embodiment, the polyacrylate comprises from 5 to 40 mole percent of hydroxyalkyl acrylate repeat units, such as hydroxyethyl acrylate, hydroxyethyl methacrylate, hydroxybutyl methacrylate, and others known in the art. The polyacrylate can be prepared by synthesis techniques well-known in the art. Starting monomer materials may include, in addition to the above-described functional acrylates, one or more other acrylates such as the preferred butyl methacrylate and cyclohexylmethyl methacrylate, and also methyl acrylate, methyl macrylate, acrylic acid, and the like. The polyacrylate block can also incorporate other copolymers of ethylenically unsaturated monomers, such as vinyl monomers (e.g., vinyl chloride).

The polyacrylate used according to the invention can be represented by the formula:

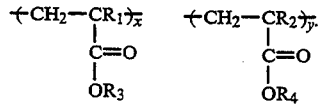

According to this formula, $R_1$ and $R_2$ are each independently hydrogen or methyl. $R_3$ is hydrogen or substituted or unsubstituted alkyl (e.g., methyl, ethyl, butyl, cyclohexyl, 3-chloropropyl). $R_4$ is hydroxyalkyl (e.g., hydroxyethyl, hydroxybutyl). Finally, x represents 0 to 97 mole percent and y represents 3 to 100 mole percent.

The polyester block used in the practice of the invention can be derived from polyester that has the necessary functional groups and molecular composition to react with an isocyanate functionality. Such polyesters are well-known in the art, and include a wide variety of polyester polyols. In a preferred embodiment, the polyester is terminated on each end with a hydroxyl functional group. The polyester can be prepared by synthesis techniques well-known in the art (e.g., polycondensation of dihydroxy compounds and dicarboxylic acids or self-polycondensation of hydroxycarboxylic acids), from known polyester monomer starting materials, such as isophthalic acid, adipic acid, neopentyl glycol, propylene glycol, and ethylene glycol.

The polyisocyanate used in the preparation of the block copolymer of the invention may be selected from a variety of materials known in the art for such purposes, such as p-phenylene diisocyanate, biphenyl-4,4'-diisocyanate, toluene diisocyanate (TDI), 3,3'-dimethyl-4,4'-biphenylene diisocyanate, 1,4-tetramethylene diisocyanate, 1,6-hexamethylenediisocyanate, 2,2,4-trimethylhexane-1,6-diisocyanate, methylene bis-(phenyl isocyanate), 1,5-naphthalene diisocyanate, isophorone diisocyanate (IPDI), and methylene bis-(4-cyclohexylisocyanate). Aliphatic diisocyanates, such as 1,6-hexamethylenediisocyanate and methylene bis-(4-cyclohexylisocyanate) are preferred.

The polyurethane copolymer is capped with a silane group by reaction with an aminoalkoxysilane or a mercaptoalkoxysilane. The group that is thus bonded to the copolymer preferably has the structure —A—$R^1$—Si—$(OR)_3$. The group A can be sulfur, —NH—, or an alkylamino group in which the alkyl portion contains from one to six carbon atoms. The bridging group $R^1$ may be a divalent hydrocarbon radical, a divalent hydrocarbon radical containing one or more oxygen ether linkages, or a divalent hydrocarbon radical containing one or more —NH—linkages. The end-capping of the polyurethane block copolymer is achieved by including a silane compound (e.g., gamma-aminopropyltrimethoxy-silane, gamma-aminopropyltriethoxysilane, and N-beta-aminoethyl-gamma-aminopropyltrimethoxysilane) in the reaction mixture.

The polyurethane block copolymer of the invention preferably has a glass transition temperature of between 10° C. and 110° C., and more preferably between 25° C. and 100° C.

The polyurethane block copolymer of the invention preferably comprises from 50 to 75 weight percent of the polyester block and from 5 to 40 weight percent of the polyacrylate block. The remaining portions of the block copolymer can be made up of the residue of the diisocyanate used to form the urethane linkages, the silane capping groups, and other copolymer blocks having the requisite functional groups and/or chemical composition so that they can react with a diisocyanate to be incorporated into the polyurethane (e.g., low molecular weight diols such as R45HT, available from Atochem), low molecular weight polyamines (e.g., Jeffamine ®, available from Texaco). A coating composition containing the polyurethane block copolymer can be prepared by first obtaining a desirable particle size of the polymer (e.g., 5 to 40 μm) by grinding, milling, or other known methods, and then dissolving the copolymer in a suitable solvent. Such solvents are preferably polar organic solvents such as methylethyl ketone, methanol, cyclohexanone, and ethylacetate, although nonpolar solvents, such as toluene and xylene can also be used. In a preferred embodiment, the amount of solvent is sufficient to provide a coating composition having a viscosity that is low enough so that a uniform layer can be coated by brushing or spraying (e.g., 100 to 500 cps). The coating composition may contain any of a number of known addenda, such as dispersing aids, other polymers, pigments, dyes, antioxidants, UV absorbers, and the like.

The coating composition can be coated onto any surface, such as a non-porous surface (e.g., glass, steel, aluminum), and cured by exposure to moisture. The coating may be applied by any of a number of known techniques, such as by brushing, spraying, dip-coating, roll coating, and the like. In a preferred embodiment, the composition is applied by brushing, especially when the substrate to be coated is glass. As described above, one preferred use of the polyurethane block copolymer of the present invention is as a glass primer for automotive glass, especially windshields.

The invention is further described in the following examples.

PREPARATION 1

A low molecular weight polyester was made using neopentyl glycol, adipic acid, and isophthalic acid in a mole ratio of 1:1.4, COOH:OH. This reaction was carried out in a three necked reaction vessel with fractioning column, thermometer, condenser, mantle, and mechanical stirrer. The endpoint is determined by titration for acid number. This low molecular weight polyester is then dissolved in toluene to seventy percent solids.

PREPARATION 2

Following the procedure of Preparation 1, a polyester resin was made using a mole ratio of 1:1.2, COOH:OH. The endpoint was similarly determined and the resultant resin was dissolved in toluene for formulation and evaluation.

EXAMPLE 1

A mixture of 25 g of the polyester of Preparation 2 and 16.3 g of Acryloid ® AU608S (commercially available hydroxyl-functional acrylic crosslinker from Rohm and Haas, (EW=600 solids basis) was prepared. This mixture was extended with 12.03 g of dicyclohexylmethane diisocyanate, with 100 g of toluene in the presence of 0.05% dibutytin diacetate. The reaction was carried out in a three necked reaction vessel equipped with a thermometer, mantle, mechanical stirrer, condenser, in an argon atmosphere. In this mixture, the ratio of equivalents OH:NCO is 1:1.4. Thus, when urethane linkage reaction completed, 0.4 equivalents of NCO is left unreacted. This endpoint is determined by titration for isocyanate content. After reaction completed, free isocyanate is then reacted with gamma-aminotrimethoxy-silane until isocyanate was no longer detected by infrared spectroscopy or titration for isocyanate.

EXAMPLE 2

Example 1 was followed except there was 0.05% isocyanate left after reaction with gamma-aminotrimethoxysilane. This endpoint was determined by titration for isocyanate.

EXAMPLE 3

Example 1 was followed except gamma-mercaptopropyltrimethoxy-silane is used as the capping agent so that no isocyanate can be detected by infrared spectroscopy or titration.

EXAMPLE 4

Example 13 was followed except gamma-mercaptopropyltrimethoxy-silane is used as the capping agent so that 0.08% free isocyanate is left after the reaction was complete. Endpoint determined by titration.

EXAMPLE 5

A mixture of 50 g of a polyester resin prepared in Preparation 2 and Acryloid ® AU608S was prepared. This mixture was extended following the procedure of Example 1, with 12.03 g of MDI.

EXAMPLE 6

A primer composition was compounded by using resin prepared in Example 3, and 2% Ketjenblack ® 300J carbon black (available from Akzo Chemical).

This mixture was ground in a ball mill up to 12 hours to a fineness of 5 on a Hegman gauge.

EXAMPLE 7

The procedure of Example 6 was repeated, except that the carbon black was replaced with 2% Raven ® 5000 carbon black (available from Colombia Chemical) was used.

EXAMPLE 8

A primer was compounded by using the resin prepared in Example 1 and 2% Sterling ® R carbon black (available from Cabot). This mixture was ground in a ball mill up to 9 hours to a fineness of 5 on a Hegman gauge.

EXAMPLE 9

A primer was compounded by using resin from Example 4, and 2% carbon dispersion 2106 (commercially available from Monochem). This mixture was ground in a ball mill up to 6 hours to a fineness of 5 on a Hegman gauge.

EXAMPLE 10

The procedure of Example 9 was repeated, except that the carbon dispersion was replaced with 2% Sterling ® R carbon black, commercially available from Cabot was used.

EXAMPLE 11

The primer compositions from Examples 6–10 dispersed in anhydrous methylethyl ketone at a ration of 1:1 to form a coating composition having a viscosity of 150 cps. For comparison purposes, a coating composition was used that contained a polymer that was substantially the same as that of Example 1, except that it contained no polyacrylate. These coating compositions were brushed onto glass pieces measuring 1"×4" and allowed to dry. A moisture-curable urethane sealant bead was then applied so that the glass plates sandwiched the sealant bead to a ¼ width. These specimens were allowed to cure for three days at room temperature, 50% relative humidity. Identical specimens were cured for seven days at 100% relative humidity and 36.7° C. Identical samples were also subjected to weathering tests in an Atlas Carbon Arc Weatherometer, and put in an oven for two weeks at a temperature of 190° F. After exposure, the specimens were subjected to shear force to the point of failure. The results are shown in Table 1 below.

icantly improved performance as a glass primer for adhesives over the comparison.

The invention has been described in detail with reference to preferred embodiments thereof. It should be understood, however, that variations and modifications can be made within the spirit and scope of the invention.

What is claimed is:

1. A polyurethane block copolymer comprising urethane linkages derived from polyisocyanate, at least one polyester block having terminal hydroxyl functional groups, and at least one polyacrylate or polymethacrylate block, said polyurethane block copolymer being end-capped with a silane group by reaction with isocyanate groups on said copolymer, wherein the ratio of said hydroxyl groups to said isocyanate groups is approximately 1:1.4.

2. A polyurethane block copolymer according to claim 1 having a glass transition temperature of between 10° C. and 110° C.

3. A polyurethane block copolymer according to claim 2 having a glass transition temperature of between 25° C. and 100° C.

4. A polyurethane block copolymer according to claim 1 wherein the copolymer comprises from 50 to 75 mole percent of said polyester block and from 5 to 40 mole percent of said polyacrylate block.

5. A polyurethane block copolymer according to claim 1 wherein said polyacrylate block is derived from a polyacrylate that comprises repeating units of a hydroxyalkyl acrylate.

6. A polyurethane block copolymer according to claim 5 wherein said polyacrylate comprises from 5 to 40 mole percent hydroxyalkyl acrylate repeat units.

7. A polyurethane block copolymer according to claim 5 wherein the hydroxyalkyl acrylate is selected from the group consisting of hydroxyethyl acrylate, hydroxyethyl methacrylate, and hydroxybutyl methacrylate.

8. A polyurethane block copolymer according to claim 7, wherein said polyacrylate further comprises repeating units of at least one other acrylate selected from the group consisting of butyl methacrylate and cyclohexylmethyl methacrylate.

9. A polyurethane block copolymer according to claim 1 wherein said polyacrylate block is derived from a polyacrylate comprising randomly repeating units according to the formula:

| | Ceramic Coated Glass Results Comparison Data | | | | | |
|---|---|---|---|---|---|---|
| | Comparison Glass Primer | Example 6 | Example 7 | Example 8 | Example 9 | Example 10 |
| 3 Days Room Temp. | Cohesive Failure 350 psi | Cohesive Failure 400 psi | Cohesive Failure 422 psi | Cohesive Failure 500 psi | Cohesive Failure 563 psi | Cohesive Failure 580 psi |
| 7 Days 100% Relative Humidity 100° F. | Passes Fair 350 psi | Adhesive Fair 200 psi | passes Failure 300 psi | Cohesive Failure 536 psi | Cohesive Failure 516 psi | Cohesive Failure 543 psi |
| 14 Days 190° F. | Adhesive Failure 280 psi | Adhesive Failure 212 psi | Passes Fair 316 psi | Cohesive Failure 426 psi | Cohesive Failure 483 psi | Cohesive Failure 500 psi |

The data in Table 1 demonstrate that the polyurethane block copolymer of the invention provided signif-

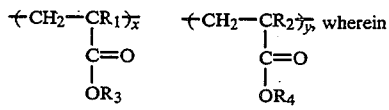

$R_1$ and $R_2$ are each independently hydrogen or methyl, $R_3$ is hydrogen or substituted or unsubstituted alkyl, $R_4$ is hydroxyalkyl, x represents 0 to 97 mole percent, and y represents 3 to 100 mole percent.

10. A polyurethane block copolymer according to claim 1 wherein said polyester block is prepared from an acid selected from the group consisting of isophthalic acid and adipic acid, and a glycol selected from the group consisting of neopentyl glycol, propylene glycol, and ethylene glycol.

11. A polyurethane block copolymer according to claim 1 wherein said blocks are linked through the residue of an aliphatic diisocyanate.

12. A coating composition comprising a polyurethane block copolymer according to claim 1.

13. An article comprising a glass substrate having at least one layer thereon comprising a polyurethane block copolymer comprising urethane linkages derived from polyisocyanate, at least one polyester block having terminal hydroxyl functional groups, and at least one polyacrylate or polymethacrylate block, said polyurethane block copolymer being end-capped with a silane group by reaction with isocyanate groups on said copolymer, wherein the ratio of said hydroxyl groups to isocyanate groups is approximately 1:1.4.

14. An article according to claim 13 wherein the polyurethane block copolymer has a glass transition temperature of between 10° C. and 110° C.

15. An article according to claim 14 wherein the polyurethane block copolymer has a glass transition temperature of between 25° C. and 100° C.

16. An article according to claim 13 wherein the copolymer comprises from 50 to 75 mole percent of said polyester block and from 5 to 40 mole percent of said polyacrylate block.

17. An article according to claim 13 wherein the polyacrylate block is derived from a polyacrylate comprising repeating units of a hydroxyalkyl acrylate.

18. An article according to claim 17 wherein said polyacrylate comprises from 5 to 40 mole percent hydroxyalkyl acrylate repeat units.

19. An article according to claim 17 wherein the hydroxyalkyl acrylate is selected from the group consisting of hydroxyethyl acrylate, hydroxyethyl methacrylate, and hydroxybutyl methacrylate.

20. An article according to claim 19, wherein said polyacrylate further comprises repeating units of at least one other acrylate selected from the group consisting of butyl methacrylate and cyclohexylmethyl methacrylate.

21. An article according to claim 13 wherein said polyacrylate block is derived from a polyacrylate comprising randomly repeating units according to the formula:

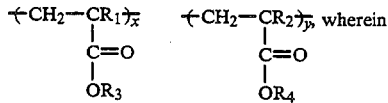

$R_1$ and $R_2$ are each independently hydrogen or methyl, $R_3$ is hydrogen or substituted or unsubstituted alkyl, $R_4$ is hydroxyalkyl, x represents 0 to 97 mole percent, and y represents 3 to 100 mole percent.

22. An article according to claim 13 wherein the polyester block of said polyurethane block copolymer is prepared from an acid selected from the group consisting of isophthalic acid and adipic acid, and a glycol selected from the group consisting of neopentyl glycol, propylene glycol, ethylene glycol.

23. An article according to claim 13 wherein the blocks of said polyurethane block copolymer are linked through the residue of an aliphatic diisocyanate.

* * * * *